United States Patent
Orange et al.

(10) Patent No.: US 6,881,256 B2
(45) Date of Patent: Apr. 19, 2005

(54) FIRE-RESISTANT HIGH PERFORMANCE CONCRETE COMPOSITION

(75) Inventors: Gilles Orange, Soisy sous Montmorency (FR); Evelyne Prat, Pantin (FR); Pascal Casanova, Lyons (FR); Mouloud Behloul, Paris (FR)

(73) Assignees: Rhodia Chimie, Boulogne Billancourt Cedex (FR); Bouygues Travaux Publics, Saint Quentin Yvelines Cedex (FR); Lafarge, Paris (FR)

( * ) Notice: Subject to any disclaimer, the term of this patent is extended or adjusted under 35 U.S.C. 154(b) by 0 days.

(21) Appl. No.: 10/203,378

(22) PCT Filed: Feb. 8, 2001

(86) PCT No.: PCT/FR01/00369

§ 371 (c)(1),
(2), (4) Date: Feb. 20, 2003

(87) PCT Pub. No.: WO01/58826

PCT Pub. Date: Aug. 16, 2001

(65) Prior Publication Data

US 2003/0150364 A1 Aug. 14, 2003

(30) Foreign Application Priority Data

Feb. 11, 2000 (FR) .............................. 00 01742

(51) Int. Cl.$^7$ .................... C04B 14/48; C04B 16/06
(52) U.S. Cl. .................... 106/644; 106/640; 106/643; 252/601
(58) Field of Search ................ 106/640, 643, 106/644; 252/601

(56) References Cited

FOREIGN PATENT DOCUMENTS

| DE | 196 54 502 | 6/1998 |
|---|---|---|
| EP | 0 934 915 | 8/1999 |
| FR | 2 778 654 | 11/1999 |

*Primary Examiner*—Anthony J. Green
(74) *Attorney, Agent, or Firm*—Young & Thompson

(57) ABSTRACT

The invention concerns the use of organic fibers having a melting point lower than 300° C., an average length l more than 1 mm and a diameter Ø not more than 200 μm, in ultra high performance concrete for improving the concrete fire resistance, the amount of organic fibers being such that their volume ranges between 0.1 and 3% of the concrete volume after setting and the concrete having a compressive strength at 28 days of at least 120 Mpa, a bending strength of at least 20 Mpa, and a spread value in non-hardened state of at least 150 mm, the values being for a concrete preserved at 20° C., the concrete consisting of a particularly hardened cement matrix wherein metal fibres are dispersed.

32 Claims, No Drawings

FIRE-RESISTANT HIGH PERFORMANCE CONCRETE COMPOSITION

CROSS REFERENCE TO RELATED APPLICATION

This is the 35 USC 371 national stage of international application PCT/FR01/00369 filed on Feb. 8, 2001, which designated the United States of America.

FIELD OF THE INVENTION

The present invention relates to the field of concretes, more particularly fiber concretes. The aim of the present invention is, in particular, to obtain, for an ultrahigh-performance concrete allowing especially structural elements intended for the manufacture of buildings and structures to be produced, a high fire resistance combined with controllable rheology and high mechanical properties. The aim of the invention is also to obtain an improved concrete having fire-protection properties superior to those of the elements of the prior art.

BACKGROUND OF THE INVENTION

Ductile concretes called "ultrahigh-performance" concretes are used especially for the construction of prestressed or non-prestressed concrete elements requiring superior mechanical properties, especially a high compressive strength. These concretes have a high flexural strength, typically at least 20 MPa, and a 28-day compressive strength of at least 120 MPa and a 28-day elastic modulus of greater than 45 GPa, these values being for a concrete stored and maintained at 20° C.

To improve the mechanical characteristics of these concretes, various solutions have been recommended.

Thus, WO 95/01316 proposes the incorporation of metal fibers in a controlled amount and having dimensions chosen within defined proportions with respect to that of the aggregate particles constituting the matrix of the concrete.

The subject matter of WO 99/28267 also relates to ultrahigh-performance concretes containing metal fibers. To improve the mechanical strength of the concretes, especially their behavior both with respect to the initiation of microcracks and to the propagation of macrocracks, that document proposes the incorporation into the cementitious matrix of particles improving the toughness, these being chosen from acicular or flakelike particles having a mean size of at most 1 mm.

The acicular particles mentioned are mineral fibers, such as wollastonite, bauxite, mullite, potassium titanate, silicon carbide, calcium carbonate and hydroxyapatite fibers, or organic fibers derived from cellulose, these fibers optionally being able to have a surface coating of a polymeric organic compound.

The subject matter of WO 99/58468 relates to ultrahigh-performance concretes containing organic fibers such as reinforcing fibers so as to improve the ductility of these concretes. In that application, ultrahigh-performance concretes are also envisaged in which some of the organic fibers are replaced with metal fibers. It is also described that the organic fibers modify the fire behavior of the concrete.

The very-high-performance concretes described above, because of their mechanical properties, possess, however, insufficient fire resistance, this being manifested at best by spalling of the structures exposed to fire and possibly even explosion of these structures due to the vapor pressure of the water, which is physically or chemically bound by the constituents of the matrix, owing to the effect of the heat.

U.S. Pat. No. 5,749,961 proposes to improve the fire-resistance properties of compositions for high-performance fiber-free concretes having compressive strengths of around 90 to 105 MPa by the addition, into these compositions, of a combination of precipitated silica and of fibers capable of forming, by dissolution, softening, decomposition, shrinkage or melting, a network of capillary pores having a diameter of at least 10 $\mu$m and a length of at least 5 mm. However, one of the means mentioned in that patent and widely practiced in refractory concretes, which consists in introducing organic fibers into the concrete, firstly has the effect of seriously decreasing the mechanical strength of the hardened concrete, since the fibers introduce a smaller volume of elasticity than that of the matrix. Secondly, the rheological properties of the concrete in the fresh state are seriously reduced by the presence of the organic fibers in the composition, and are characterized by a low spread.

It therefore becomes difficult to conceive of applying such solutions to ultrahigh-performance ductile concretes as described in patent applications WO 99/28267 and WO 99/58468, which already recommend fiber volumes of around 2%.

It is important to be able to have compositions for ultrahigh-performance concretes having a rheology range which can go from plastic behavior to fluid behavior. Such concretes conventionally have a spread value of at least 150 mm, the spread value being measured by the shock table technique, a standardized technique used in general for mortars.

Nevertheless, until now, such concrete compositions have the drawback of exhibiting mediocre fire resistance.

Until now, attempts to improve the mechanical properties of ultrahigh-performance concretes have had deleterious effects on the fire resistance. Conversely, the solutions proposed for improving the fire behavior of concretes have the effect in general of decreasing the mechanical and/or rheological properties of these concretes in the unhardened state.

There is therefore no satisfactory solution to the problem of fire resistance of ultrahigh-performance concretes containing fibers, compatible with the desired properties of these concretes, namely high tensile/flexural strength, high compressive strength and rheology of the concrete in the unhardened state able to range from plastic behavior to fluid behavior.

SUMMARY OF THE INVENTION

The subject of the present invention is an ultrahigh-performance concrete containing metal reinforcing fibers, possessing properties at least equivalent to those of similar concretes in the prior art, the rheology of the concrete in the unhardened state being able to range from plastic behavior to fluid behavior, and the concrete exhibiting good fire resistance.

This objective is achieved by the present invention, which consists in the use of organic fibers having a melting point of less than 300° C., an average length l of greater than 1 mm and a diameter $\varnothing$ of at most 200 $\mu$m, in an ultrahigh-performance concrete in order to improve the fire resistance of the concrete, the amount of organic fibers being such that their volume ranges between 0.1 and 3% of the volume of the concrete after setting and the concrete having a characteristic 28-day compressive strength of at least 120 MPa, a characteristic flexural strength of at least 20 MPa and a spread value in the unhardened state of at least 150 mm, these values being given for a concrete stored and maintained at 20° C., said concrete consisting of a hardened cementitious matrix in which metal fibers are dispersed, which is obtained by mixing, with water, a composition which comprises, apart from the fibers:

(a) cement;

(b) aggregate particles having a particle size $D_{90}$ of at most 10 mm;

(c) pozzolanic-reaction particles having an elementary size ranging between 0.1 and 100 μm;

(d) at least one dispersing agent; and satisfying the following conditions:

(1) the percentage by weight of water with respect to the combined weight of the cement (a) and of the particles (c) lies within the 8–24% range;

(2) the metal fibers have an average length $l_1$ of at least 2 mm and an $l_1/\varnothing_1$ ratio of at least 20, $\varnothing_1$ being the diameter of the fibers;

(3) the ratio, $V_1/V$, of the volume $V_1$ of the metal fibers to the volume V of the organic fibers is greater than 1 and the ratio, $l_1/l$, of the length of the metal fibers to the length of the organic fibers is greater than 1;

(4) the ratio R of the average length $l_1$ of the metal fibers to the size $D_{90}$ of the aggregate particles is at least 3, preferably at least 5;

(5) the amount of metal fibers is such that their volume is less than 4% of the volume of the concrete after setting.

The subject of the invention is also a fire-resistant ultrahigh-performance concrete having a characteristic 28-day compressive strength of at least 120 MPa, a characteristic flexural strength of at least 20 MPa and a spread value in the unhardened state of at least 150 mm, these values being given for a concrete stored and maintained at 20° C.; said concrete consisting of a hardened cementitious matrix in which metal fibers are dispersed, which is obtained by mixing, with water, a composition which comprises, apart from the fibers:

(a) cement;

(b) aggregate particles having a particle size $D_{90}$ of at most 10 mm;

(c) pozzolanic-reaction particles having an elementary size ranging between 0.1 and 100 μm;

(d) at least one dispersing agent;

(e) organic fibers; and satisfying the following conditions:

(1) the percentage by weight of water with respect to the combined weight of the cement (a) and of the particles (c) lies within the 8–24% range;

(2) the metal fibers have an average length $l_1$ of at least 2 mm and an $l_1/\varnothing_1$ ratio of at least 20, $\varnothing_1$ being the diameter of the fibers;

(3) the organic fibers have a melting point of less than 200° C., an average length l of greater than 1 mm and a diameter $\varnothing$ of at most 200 μm;

(4) the ratio, $V_1/V$, of the volume $V_1$ of the metal fibers to the volume V of the organic fibers is greater than 1 and the ratio, $l_1/l$, of the length $l_1$ of the metal fibers to the length l of the organic fibers is greater than 1;

(5) the ratio R of the average length $l_1$ of the metal fibers to the size $D_{90}$ of the aggregate particles is at least 3, preferably at least 5;

(6) the amount of metal fibers is such that their volume is less than 4% of the volume of the concrete after setting;

(7) the amount of organic fibers is such that their volume ranges between 0.1 and 3% of the volume of the concrete after setting.

Thus, thanks to a novel concept of the cementitious matrix and of its relationship with the reinforcing fibers, this solution solves the problem posed with this compromise of mechanical/rheology/fire-resistance properties.

DETAILED DESCRIPTION OF THE INVENTION

The term "cementitious matrix" denotes the hardened cementitious composition with no metal fibers.

$D_{90}$ means that 90% by weight of the aggregate articles have a particle size of less than or equal to 10 mm, the particle size being measured by the mesh sizes of the screens whose undersize constitutes 90% of the total weight of the particles.

$D_{75}$ means that 75% by weight of the aggregate particles have a particle size of less than or equal to 10 mm, the particle size being measured by the mesh sizes of the screens whose undersize constitutes 75% of the total weight of the particles.

The term "organic fibers" is understood to mean all the polymeric fibers satisfying the above conditions.

Within the context of the invention, the expression "diameter of the fibers" is understood to mean the equivalent diameter when the fibers are of noncircular cross section.

The term "flexural strength" is understood to mean the 4-point flexural strength measured on test specimens having the dimensions of 7×7×28 cm.

Advantageously, the organic fibers have a length l of greater than 1.5 mm and of at most 12 mm.

The l/Ø ratio is advantageously between 20 and 500.

According to one embodiment of the invention, the diameter of the organic fibers is between 2 and 100 μm, preferably less than 80 μm.

The ratio $V_1/V$ is preferably at least 2.

According to a variant, the amount of organic fibers is preferably such that their volume is less than 2% of the volume of the concrete after setting, preferably less than 1%.

The organic fibers may consist of any homopolymer or copolymer having a melting point of at most 300° C., preferably a melting point of at most 275° C. According to a preferred embodiment, the melting point of the fibers is less than or equal to 200° C.

Mention may especially be made of organic fibers which consist of a homopolymer or copolymer chosen from polyacrylamide, polyether sulfone, polyvinyl chloride, polyethylene, polypropylene, polystyrene, polyamide and polyvinyl alcohol, by itself or as a mixture. According to one particular embodiment, the organic fibers are polypropylene fibers having a length of 6 mm and a diameter of 18 μm.

With regard to the metal fibers, these may be metal fibers chosen from among steel fibers, such as high-strength steel fibers, amorphous steel fibers or stainless steel fibers. Optionally, the steel fibers may be coated with a nonferrous metal such as copper, zinc, nickel (or their alloys).

The average length of the metal fibers is preferably within the 5–30 mm range. The $l_1/\varnothing_1$ ratio is preferably at most 200.

Metal fibers of variable geometry may be used. They may be crenelated, corrugated or crook-shaped at the ends. It is also possible to vary the roughness of the fibers and/or to use fibers of variable cross section. The fibers may be obtained by any suitable technique, including the braiding or cabling of several metal wires forming a twisted assembly.

The amount of metal fibers is such that their volume is preferably less than 3.5% of the volume of the concrete after setting.

Advantageously, the average bonding stress of the metal fibers in the hardened cementitious matrix must be at least 10 MPa, preferably at least 15 MPa. This stress is determined by a test comprising the extraction of a single fiber embedded in a block of concrete.

It has been found that the concretes according to the invention having in addition both such a fiber bonding stress and a high matrix toughness (preferably at least 15 J/m$^2$) result in a better mechanical performance, by synergy between these two properties.

The level of fiber/matrix bonding may be controlled by several means, which may be used individually or simultaneously.

According to a first means, the bonding of the fibers in the cementitious matrix may be achieved by treating the surface of the fibers. This fiber treatment may be carried out by at least one of the following processes:

fiber etching;

deposition of a mineral compound on the fibers, especially by depositing a metal phosphate.

The etching may be carried out, for example, by bringing the fibers into contact with an acid, followed by neutralization.

In general, a metal phosphate is deposited using a phosphatizing process, which consists in introducing prepickled metal fibers into an aqueous solution comprising a metal phosphate, preferably manganese phosphate or zinc phosphate, and then in filtering the solution in order to recover the fibers. Next, the fibers are rinsed, neutralized and then rinsed again. Unlike the usual phosphatizing process, the fibers obtained do not have to undergo grease-type finishing. However, they may be optionally impregnated with an additive either in order to provide anticorrosion protection or to make it easier for them to be processed with the cementitious medium. The phosphatizing treatment may also be carried out by coating or spraying the metal phosphate solution onto the fibers.

Any type of phosphatizing process may be used—reference may be made on this subject to the treatments described in the article by G. Lorin entitled "*The Phosphatizing of Metals*" 1973.

According to a second means, the bonding stress of the fibers in the cementitious matrix may be achieved by introducing into the composition at least one of the following compounds: silica compounds comprising mostly silica, precipitated calcium carbonate, polyvinyl alcohol in aqueous solution, a latex or a mixture of said compounds.

The phrase "silica compound comprising mostly silica" should be understood here to mean synthetic products chosen from among precipitated silicas, silica sols, pyrogenic silicas (of the Aerosil type), aluminosilicates, for example Tixosil 28 sold by Rhône-Poulenc, or clay-type products (either natural or derived), for example smectites, magnesium silicates, sepiolites and montmorillonites.

It is preferred to use at least one precipitated silica.

Precipitated silica should be understood here to mean a silica obtained by precipitation from the reaction of an alkali metal silicate with an acid, generally an inorganic acid, with a suitable pH of the precipitation medium, in particular a basic, neutral or slightly acid pH; any method may be used to prepare the silica (addition of acid to a silicate sediment, total or partial simultaneous addition of acid or of silicate to a water or silicate-solution sediment, etc.), the method being chosen depending on the type of silica that it is desired to obtain; after the precipitation step there generally follows a step of separating the silica from the reaction mixture using any known means, for example a filter press or a vacuum filter; a filter cake is thus collected, which is washed if necessary; this cake may, optionally after crumbling, be dried by any known means, especially by spray drying, and then optionally ground and/or agglomerated.

In general, the amount of precipitated silica introduced is between 0.1% and 5% by weight, expressed as dry matter, with respect to the total weight of the concrete. Above 5%, rheology problems during preparation of the mortar usually arise.

Preferably, the precipitated silica is introduced into the composition in the form of an aqueous suspension. This may especially be an aqueous silica suspension having:

a solids content of between 10 and 40% by weight;

a viscosity of less than $4\times10^{-2}$ Pa.s for a shear rate of 50 s$^{-1}$;

an amount of silica contained in the supernatant of the said suspension after centrifuging at 7 500 rpm for 30 minutes of more than 50% of the weight of the silica contained in the suspension.

This suspension is more particularly described in patent application WO-A-96/01787. The Rhoximat CS 60 SL silica suspension sold by Rhône-Poulenc is particularly suitable for this type of concrete.

The cement (a) of the concrete according to the invention is advantageously a Portland cement, such as the Portland cements CPA PMES, HP, HPR, CEM I PMES, 52.5 or 52.5R or HTS (high silica content).

The aggregate particles (b) are essentially screened or ground fine sands or mixtures of fine sands, which advantageously may comprise silicious sands, particularly quartz flour.

The particle size $D_{75}$ of these aggregates is preferably at most 6 mm.

These aggregate particles are generally present in an amount of 20 to 60% by weight of the cementitious matrix, preferably from 25 to 50% by weight of said matrix.

The fine pozzolanic-reaction particles have an elementary size preferably of at least 0.1 μm and at most 1 μm, preferably at most 0.5 μm. They may be chosen from among silica compounds, fly ash, blast-furnace slag and clay derivatives, such as kaolin. The silica may be a silica fume coming from the zirconium industry rather than a silica fume coming from the silicon industry.

Within the context of the invention, the concretes described above optionally contain reinforcing particles. These reinforcing particles are added to the composition forming the matrix so as to increase the toughness thereof.

The toughness is expressed either in terms of stress (stress intensity factor: $K_c$) or in terms of energy (critical strain energy release rate: $G_c$), using the formalism of linear fracture mechanics. Preferably, the toughness of the cementitious matrix is at least 15 J/m$^2$, advantageously at least 20 J/m$^2$. The method of measuring the toughness has been described in patent application PCT WO 99/28267.

The toughness of the cementitious matrix is advantageously obtained by adding to the cementitious composition reinforcing particles of mean size of at most 1 mm, preferably at most 500 μm, these being in acicular form or in the form of flakes. They are generally present in a volume proportion of less than 35%, in particular in the range 5–25% of the combined volume of the aggregate particles (b) and of the pozzolanic-reaction particles (c).

The term "size" of the reinforcing particles should be understood to mean the size of their largest dimension (especially the length in the case of those of acicular form).

These may be natural or synthetic products.

The reinforcing particles of acicular form are advantageously chosen from among fibers less than 1 mm in length, for example wollastonite fibers, bauxite fibers, mullite fibers, potassium titanate fibers, silicon carbide fibers, cellulose or cellulose-derivative fibers, such as cellulose acetate, carbon fibers, calcium carbonate fibers, hydroxyapatite fibers and other calcium phosphates, or derived products obtained by grinding said fibers and mixtures of said fibers.

Preferably, reinforcing particles are used whose acicularity, expressed by the length/diameter ratio, is at least 3 and preferably at least 5.

Wollastonite fibers have given good results. The reinforcing particles in flake form may be chosen from among mica flakes, talc flakes, mixed silicate (clay) flakes, vermiculite flakes, alumina flakes and mixed aluminate or silicate flakes and mixtures of said flakes.

Mica flakes have given good results.

It is possible to use combinations of these various forms or types of reinforcing particles in the composition of the concrete according to the invention. These reinforcing particles may have an organic coating. This type of treatment is particularly recommended for reinforcing particles which are natural products. Such reinforcing particles are described in detail in patent applications WO 99/28267 and EP-A-372 804.

The water-cement weight ratio, conventional in concrete technology, may vary when cement substitutes, especially pozzolanic-reaction particles, are used. For the needs of the present invention, the weight ratio of the amount of water (E) with respect to the combined weight of the cement and the pozzolanic-reaction particles has therefore been defined. This ratio, thus defined, is between approximately 8 and 24%, preferably between approximately 13 and 20%. However, in the description of the examples, the water-to-cement ratio W/C will be used.

The composition according to the invention also comprises at least one dispersing agent (d). This dispersing agent is generally a plasticizer. The plasticizer may be chosen from among lignosulfonates, casein, polynaphthalenes, particularly polynaphthalene-sulfonates of alkali metals, formaldehyde derivatives, polyacrylates of alkali metals, polycarboxylates of alkali metals and grafted polyethylene oxides. In general, the composition according to the invention comprises from 0.5 to 2.5 parts by weight of plasticizer per 100 parts by weight of cement.

Other additives may be added to the composition according to the invention, for example an antifoam agent. By way of example, propylene-glycol-based or polydimethylsiloxane-based antifoams may be used.

Among agents of this type, mention may be made especially of silicones in the form of a solution or in the form of a solid or, preferably, in the form of a resin, an oil or an emulsion, preferably in water. Most particularly suitable are silicones essentially comprising M repeat units ($RSiO_{0.5}$) and D repeat units ($R_2SiO$). In these formulae, the radicals R, which may be identical or different, are more particularly chosen from among hydrogen and alkyl radicals comprising 1 to 8 carbon atoms, the methyl radical being preferred. The number of repeat units is preferably in the 30 to 120 range.

The amount of such an agent in the composition is generally at most 5 parts by weight per 100 parts of cement.

Unless otherwise indicated, the sizes of the particles are measured by TEM (transmission electron microscopy) or SEM (scanning electron microscopy).

The matrix may also contain other ingredients as long as they do not prejudice the expected performance of the concrete.

The concrete may be obtained according to any process known to those skilled in the art, especially by mixing the solid constituents with water, forming (molding, casting, injection, pumping, extrusion, calendering) and then hardening.

For example, in order to prepare the concrete the constituents of the cementitious matrix and the metal fibers are mixed with the suitable amount of water.

Advantageously, the following order of mixing is respected:
  mixing of the pulverulent constituents of the matrix (for example for 2 minutes);
  introduction of the water and a fraction, for example half, of the admixtures;
  mixing (for example for 1 minute);
  introduction of the remaining fraction of the admixtures;
  mixing (for example for 3 minutes);
  introduction of the fibers;
  mixing (for example for 2 minutes).

According to a preferred variant, the organic fibers are introduced before the water is added.

The concrete then undergoes maturing between 20° C. and 100° C. for the time necessary to obtain the desired mechanical properties.

Maturation at a temperature close to ambient temperature gives good mechanical properties, this being the case because of the choice of constituents in the cementitious matrix. In this case, the concrete is left to mature at, for example, a temperature close to 20° C.

Maturation may also involve a heat treatment between 60 and 100° C. at normal pressure on the hardened concrete.

The concrete obtained may be especially subjected to a heat treatment between 60 and 100° C. for between 6 hours and 4 days, with the optimum time being about 2 days and the treatment starting after the end of the mixture setting phase or at least one day after the onset of setting. In general, treatment times of 6 to 72 hours are sufficient within the aforementioned temperature range.

The heat treatment is carried out in a dry or wet environment or carried out according to cycles alternating between the two environments, for example 24 hours in a wet environment followed by 24 hours in a dry environment.

This heat treatment is implemented on concretes which have completed their setting phase, these preferably being aged for at least one day and better still aged for at least approximately 7 days.

The addition of quartz powder may be useful when the concrete is subjected to the aforementioned heat treatment.

The concrete may be pretensioned, by bonded wires or by bonded tendons, or post-tensioned, by single unbonded tendons or by cables or by sheathed bars, the cable consisting of an assembly of wires or consisting of tendons.

The prestressing, whether in the pretension form or in post-tension form, is particularly well suited to products made of the concrete according to the invention.

This is because metal prestressing cables always have a very high tensile strength, but this is poorly utilized since the weakness of the matrix containing them does not allow the dimensions of the concrete structural elements to be optimized.

The concretes obtained according to the present invention have in general a direct tensile strength $R_t$ of at least 8 MPa. According to a preferred embodiment, the concretes useful for the present invention have a characteristic compressive strength of at least 150 MPa and a characteristic 4-point flexural strength $R_f$ of at least 25 MPa.

The concretes obtained according to the invention exhibit good fire resistance as illustrated in the following examples, while maintaining good physical properties both in the unhardened state and the hardened state.

The invention also relates to a composition in the form of a powder containing no metal fibers, which comprises organic fibers and at least one of the elements chosen from cement, aggregate particles, pozzolanic-reaction particles, dispersing agent and reinforcing particles, these particles being as defined above, in an amount such that upon adding the metal fibers and water to this composition the concrete of the invention is obtained.

According to one particular embodiment, the composition in powder form containing no metal fibers comprises cement, pozzolanic-reaction particles, dispersing agent and organic fibers as defined above, in an amount such that upon adding the metal fibers and water to this composition the concrete of the invention is obtained.

Illustrative examples of concretes according to the invention and fire-resistance results obtained with these concretes will be given below.

Preparation of the Specimens

The ultrahigh-performance concrete used in the following examples was obtained from the following components:
i) Portland cement: HTS (high silica content) type from Lafarge (France);
ii) Sand: BE31 quartz sand from Sifraco (France) having a $D_{75}$ of 350 μm;
iii) Quartz flour: C400 grade with 50% of the particles smaller than 10 microns, from Sifraco (France);
iv) Fumed silica: vitreous microsilica coming from the manufacture of zirconium, of the MST type with a BET specific surface area of 12 m²/g from SEPR (France);
v) Admixture: liquid OPTIMA 100 plasticizer from Chryso (France);
vi) Metal fibers: the metal fibers were steel fibers having a length of 13 mm, a diameter of 200 microns and a tensile strength of 2 800 MPa, from Bekaert (Belgium). The amounts used are indicated in the table below;
vii) Organic fibers: the organic fibers were polypropylene or polyvinyl alcohol fibers, the geometry and the amounts used of which are defined in the table below.

The concrete described below was obtained by mixing the pulverulent constituents, introducing the water and a fraction of the admixture, mixing, introducing the remaining fraction of the admixture, mixing, introducing the metal fibers and mixing, the organic fibers being introduced into the mix before adding the water. In these trials, an EIRICH RV02-type mixer with high turbulence and rotation of the vessel was used.

The molds were filled with this composition and then vibrated using the standard procedures. The test specimens were demolded 48 hours after casting. They then underwent a heat treatment consisting in storing them in an oven at 90° C. for 48 hours at 100% humidity.

The formulation of the concrete is given below:

| HTS cement | MST fumed silica | C400 quartz flour | BE31 sand | Steel fibers | Organic fibers | OPTIMA 100 plasticizer | W/C water |
|---|---|---|---|---|---|---|---|
| 1 | 0.325 | 0.3 | 1.43 | X | Y | 0.054 | 0.22 |

X and Y are the metal fiber and organic fiber contents indicated in table 1.

First Series of Tests:

The concretes were analyzed using the following analytical methods.

The compressive strength $R_c$, obtained in direct compression on a cylindrical test specimen (70 mm in diameter and 140 mm in height) at 20° C.:

$$R_c = 4F/\pi d^2$$

F being the force at break at N and d being the diameter of the specimens.

The 4-point flexural strength, measured on a 70×70×280 mm test specimen mounted on roller supports, according to the NFP 18-411, NFP 18-409 and ASTM C 1018 standards, using the formula:

$$R_f = 3F_{max}(l-l')/2dw^2$$

$F_{max}$ being the maximum force (peak force) in N, l=210 mm, l'=l/3 and d=w=70 mm.

The spread value, measured using the shock table technique (20 blows) according to the ASTM C320, ISO 2768-1 and EN 459-2 standards.

The fire resistance, determined by measuring (1) the residual characteristic 4-point flexural strength after exposing the concrete test specimens, in the form of 70×70×250 mm prisms, to temperature. The test specimens were insulated on 2 faces and the 2 noninsulated faces were exposed to the fire in a preheated furnace (400 to 500° C.) which was then raised to 800° C. over 20 minutes and then held for 1 h at 800° C.; (2) the residual characteristic compressive strength after cubic test specimens cut to 70 mm a side, have been exposed to temperature;

(3) the occurrence of explosive spalling was also checked for each specimen.

TABLE 1

| Examples | 1 | 2 | 3 | 4 | 5 | 6 | 7 |
|---|---|---|---|---|---|---|---|
| W/C | 0.22 | 0.22 | 0.22 | 0.22 | 0.22 | 0.22 | 0.22 |
| Metal fibers (vol %) X | 1.8 | 2 | 2 | 2 | 2 | 0 | 0 |
| Organic fibers (vol %) Y | 1.4 | 2 | 0.7 | 0.5 | 1 | 2.8 | 4.4 |
| Nature of the organic fibers | PP | PP | PVA | PP | PP | PVA | PVA |
| Organic fibers Length (mm) | 19 | 19 | 6 | 6 | 6 | 12 | 12 |
| Transverse dim. (μm) or diameter (μm) | 50 × 500 | 50 × 500 | 15 | 20 | 20 | 200 | 200 |

TABLE 1-continued

| Examples | 1 | 2 | 3 | 4 | 5 | 6 | 7 |
|---|---|---|---|---|---|---|---|
| Spread, 20 blows (mm) | 160 | 140 | 160 | 200 | 160 | 225 | 190 |
| Compressive strength before exposure to fire (MPa) | 165 | 175.5 | 204.5 | 181.3 | 173.3 | 165.9 | 148.4 |
| Flexural strength before exposure to fire (MPa) | 32.5 | 25.8 | 30.9 | 26.9 | 23.9 | 15.5 | 22.5 |
| Residual flexural strength after exposure to fire (MPa) | 9.3 | 11.5 | 9.4 | 11.4 | 8.7 | 0.2 | 0.3 |
| Appearance of test specimens after exposure to fire | Large cracks and splintering | Cracks | Cracks | Cracks | Cracks | Cracks and spalling | Cracks and spalling |
| Compressive strength after exposure to fire (MPa) | 82.3 | 99.5 | 106.4 | 117.4 | 89.5 | 34.1 | 27.9 |

In examples 1 and 2, the polypropylene (PP) fibers were FIBERMESH 6130 fibers—the melting point of these fibers is 170° C.

In example 3, the polyvinyl alcohol (PVA) fibers were KURARAY RMS 182 fibers, the melting point of which is 220° C.

In examples 4 and 5, the polypropylene fibers were FIBRIN 623 fibers distributed in France by Chryso SA.

In examples 6 and 7, the fibers were KURARAY RF 350 fibers.

The results obtained show that the fibers of example 1 (polypropylene: l=19 mm) allow correct fire resistance for a dosage of 2%. However, the rheology is very poor (spread/20 blows: 140 mm). For a reduced dosage (1.4%), the rheology is substantially improved (spread: 160 mm), but the fire resistance becomes very poor: presence of large cracks and splintering.

With the organic fibers of example 3 (polyvinyl alcohol: l=6 mm°)and for a dosage of Ø 0.7%, the rheology remains correct (spread: 160 mm) and the fire resistance is acceptable (no splintering).

The best results are obtained with the fibers of examples 4 and 5 (polypropylene: length=6 mm). For a reduced dosage (0.5%), the rheology is excellent (spread: 200 mm) and the fire resistance is good. The mechanical strength values (in compression and in bending) are high.

With the concretes of examples 6 and 7 which contain only organic fibers, a good concrete spread value is obtained, but these concretes, although not exploding during exposure to fire, do have mechanical properties which are greatly inferior after exposure to fire.

Second Series of Tests

The concrete prepared according to example 4 was cast as various unfilled elements. These elements were the following:

slabs of dimensions 400×300×25 mm$^3$;

columns of dimensions 300×300×700 mm$^3$ or 200×200×900 mm$^3$; and

I-beams of dimensions 2100×150×240 mm$^3$, having a web 50 mm in thickness.

Some of the elements underwent a heat treatment identical to that of the first series of tests (48 h at 90° C. and 100% humidity). All the elements, both treated and untreated, were then exposed to fire according to the EN 1365-2 standard of 18/2/99 for 2 hours (i.e. a fire temperature reaching about 1 050° C.).

The results of the tests are as follows:

the slabs, with or without heat treatment, heated only on the underside and loaded transversely with 42 daN at mid-length, suffered no deterioration;

the columns, uniformly heated, showed no spalling after the fire test;

the beam that had undergone a heat treatment was heated uniformly, and showed no spalling after the test.

The concrete of example 4 was also cast as a column with a cross section of 20×20 cm and a height of 90 cm.

After heat treatment (48 h at 90° C. and 100% humidity), two columns were subjected to a 2 000 kN compressive load (i.e. 43.6% of what the element would have withstood), with an eccentricity of 14 mm.

These specimens were exposed to fire according to the EN 1365-2 standard of 18/2/99. One of the columns was capable of withstanding the load for 89 minutes and the other for 82 minutes (which represents a fire temperature of about 1 000° C.). They exhibited minor spalling before fracture.

What is claimed is:

1. A process for improving the fire resistance of an ultra-high performance concrete which comprises adding to the concrete organic fibers having a melting point of less than 300° C., an average length l of greater than 1 mm and a diameter Ø of at most 200 μm; the amount of organic fibers being such that their volume V ranges between 0.1 and 3% of the volume of the concrete after setting; the concrete having a characteristic 28-day compressive strength of at least 120 MPa, a flexural strength of at least 20 MPa, and a spread value in the unhardened state of at least 150 mm; the compressive strength, flexural strength and spread value being given for a concrete stored and maintained at 20° C.; said concrete comprising a hardened cementitious matrix in which metal fibers are dispersed and represent a volume $V_1$ of the concrete after setting, which is obtained by mixing, with water, a composition which comprises, apart from the metal fibers:

(a) cement;

(b) aggregate particles having a particle size $D_{90}$ of at most 10 mm;

(c) pozzolanic-reaction particles having an elementary size ranging between 0.1 and 100 μm;

(d) at least one dispersing agent; and satisfying the following conditions:

(1) the percentage by weight of water with respect to the combined weight of the cement (a) and of the pozzolanic-reaction particles (c) lies within the 8–24% range;

(2) the metal fibers have an average length $l_1$ of at least 2 mm and an $l_1/\emptyset_1$ ratio of at least 20, $\emptyset_1$ being the diameter of the fibers;

(3) a ratio, $V_1/V$, of the volume $V_1$ of the metal fibers to the volume V of the organic fibers is greater than 1, and a ratio, $l_1/l$, of the length of the metal fibers to the length of the organic fibers is greater than 1;

(4) a ratio R of the average length $l_1$ of the metal fibers to the size $D_{90}$ of the aggregate particles is at least 3; and (5) the amount of metal fibers is such that their volume is less than 4% of the volume of the concrete after setting.

2. The process according to claim 1, wherein the concrete also includes reinforcing particles for improving the toughness of the matrix; said reinforcing particles having an acicular or flake shape, a mean size of at most 1 mm, and being present in a volume proportion of less than 35% of the combined volume of the aggregate particles (b) and of the pozzolanic-reaction particles (c).

3. The process according to claim 1, wherein the $l/\emptyset$ ratio of the organic fibers is between 20 and 500.

4. The process according to claim 1, wherein the organic fibers have a length l of greater than 1.5 mm and at most equal to 12 mm.

5. The process according to claim 1, wherein the organic fibers have a diameter of less than 80 μm.

6. The process according to claim 1, wherein the ratio $V_1/V$ of the metal fibers to the organic fibers is at least 2.

7. The process according to claim 1, wherein the amount of organic fibers is such that their volume is less than 2% of the volume of the concrete after setting.

8. The process according to claim 7, wherein the amount of organic fibers is such that their volume is less than 1% of the volume of the concrete after setting.

9. The process according to claim 1, wherein the organic fibers consist of a homopolymer or copolymer selected from the group consisting of polyacrylamide, polyether sulfone, polyvinyl chloride, polyethylene, polypropylene, polystyrene, polyamide and polyvinyl alcohol groups and mixtures thereof.

10. The process according to claim 1, wherein the organic fibers are polypropylene fibers.

11. The process according to claim 10, wherein the polypropylene fibers have a length of 6 mm and a diameter of 18 μm.

12. The process according to claim 1, wherein the metal fibers are steel fibers.

13. The process according to claim 1, wherein the metal fibers have a length ranging from 5 to 30 mm.

14. The process according to claim 1, wherein the aggregate particles (b) have a particle size $D_{75}$ of at most 6 mm.

15. The process according to claim 1, wherein the organic fibers have a melting point of less than or equal to 200° C.

16. A fire-resistant ultrahigh-performance concrete having a 28-day compressive strength of at least 120 MPa, a flexural strength of at least 20 MPa, and a spread value in the unhardened state of at least 150 mm; the compressive strength, the flexural strength, and the spread value being given for a concrete stored and maintained at 20° C.; said concrete comprising a hardened cementitious matrix in which metal fibers are dispersed and represent a volume $V_1$ of the concrete after setting, which is obtained by mixing, with water, a composition which comprises, apart from the metal fibers:

(a) cement;

(b) aggregate particles having a particle size $D_{90}$ of at most 10 mm;

(c) pozzolanic-reaction particles having an elementary size ranging between 0.1 and 100 μm;

(d) at least one dispersing agent;

(e) organic fibers having a volume V; and satisfying the following conditions:

(1) the percentage by weight of water with respect to the combined weight of the cement (a) and of the pozzolanic-reaction particles (c) lies within the 8–24% range;

(2) the metal fibers have an average length $l_1$ of at least 2 mm and an $l_1/\emptyset_1$ ratio of at least 20, $\emptyset_1$ being the diameter of the fibers;

(3) the organic fibers have a melting point of less than 200° C., an average length l of greater than 1 mm, and a diameter ∅ of at most 200 μm;

(4) a ratio, $V_1/V$, of the volume $V_1$ of the metal fibers to the volume V of the organic fibers is greater than 1, and a ratio, $l_1/l$, of the length $l_1$ of the metal fibers to the length l of the organic fibers is greater than 1;

(5) a ratio R of the average length $l_1$ of the metal fibers to the size $D_{90}$ of the aggregate particles is at least 3;

(6) the amount of metal fibers is such that their volume is less than 4% of the volume of the concrete after setting; and (7) the amount of organic fibers is such that their volume ranges between 0.1 and 3% of the volume of the concrete after setting.

17. The concrete according to claim 16, wherein the organic fibers have a diameter of less than 80 μm.

18. The concrete according to claim 16, wherein the $l/\emptyset$ ratio of the organic fibers is between 20 and 500.

19. The concrete according to claim 16, wherein the ratio $V_1/V$ of the metal fibers to the organic fibers is at least 2.

20. The concrete according to claim 16, wherein the organic fibers have a length of at most 12 mm.

21. The concrete according to claim 16, wherein the amount of organic fibers is such that their volume is less than 1% of the volume of the concrete after setting.

22. The concrete according to claim 16, wherein the organic fibers are polypropylene fibers having a length of less than 10 mm.

23. The concrete according to claim 22, wherein the polypropylene fibers have a length of about 6 mm and a diameter of 18 μm.

24. The concrete according to claim 16, wherein the metal fibers are steel fibers.

25. The concrete according to claim 16, wherein the metal fibers have a length ranging from 5 to 30 mm.

26. The concrete according to claim 16, further comprising reinforcing particles for improving the toughness of the matrix; said reinforcing particles having an acicular or flake shape, a mean size of at most 1 mm, and being present in a volume proportion of less than 35% of the combined volume of the aggregate particles (b) and of the pozzolanic-reaction particles (c).

27. The concrete according to claim 26, wherein the reinforcing particles have an average size of at most 500 μm and are present in a volume proportion lying within the range from 5% to 25% of the combined volume of the aggregate particles (b) and of the pozzolanic-reaction particles (c).

28. The concrete according to claim 26, wherein the reinforcing particles are wollastonite fibers.

29. The concrete according to claim 26, wherein the reinforcing particles are mica flakes.

30. The concrete according to claim 16, wherein the aggregate particles (b) have a particle size $D_{75}$ of most 6 mm.

31. The concrete according to claim 16, which is prestressed in pretension.

32. The concrete according to claim 16, which is prestressed in post-tension.

* * * * *